Aug. 20, 1935.  E. W. KELLOGG  2,012,130
FILM GUIDING DEVICE
Filed Dec. 18, 1930
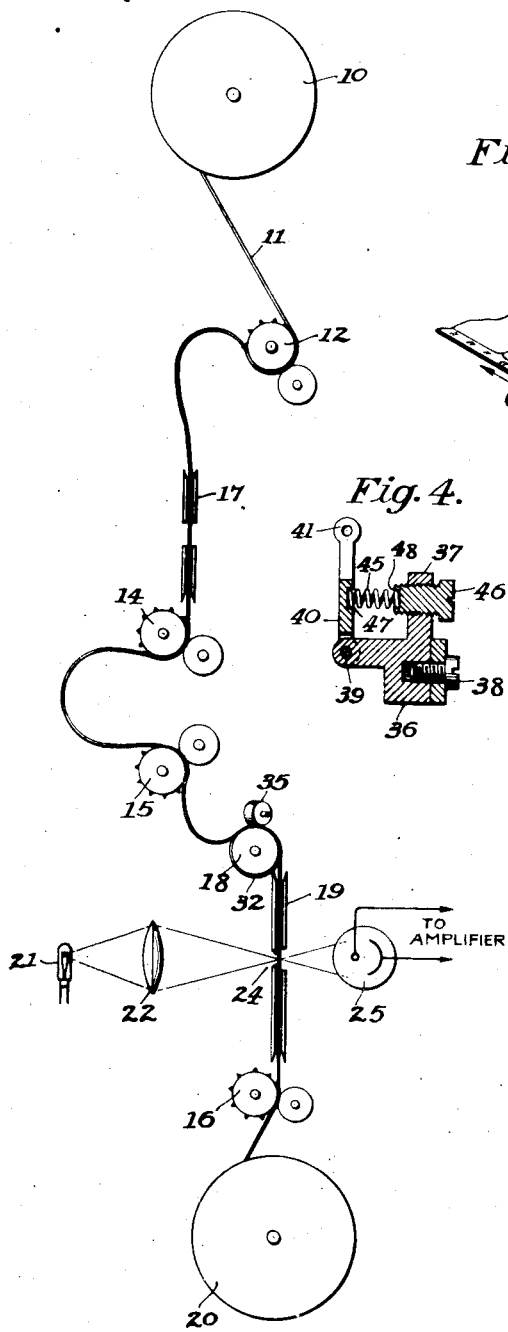
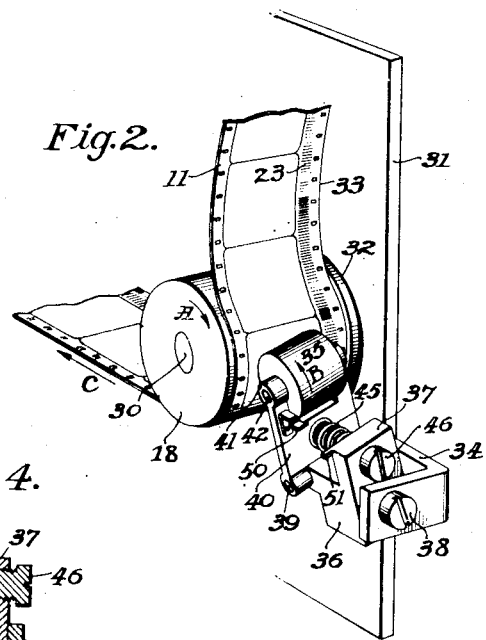
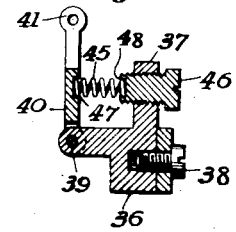
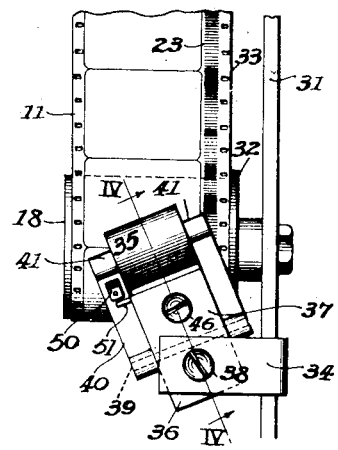
INVENTOR:
Edward W. Kellogg,
BY
HIS ATTORNEY.

Patented Aug. 20, 1935

2,012,130

UNITED STATES PATENT OFFICE 2,012,130

FILM GUIDING DEVICE

Edward Washburn Kellogg, Moorestown, N. J., assignor, by mesne assignments, to Radio Corporation of America, New York, N. Y., a corporation of Delaware Application December 18, 1930, Serial No. 503,151

8 Claims. (Cl. 271—2.3)

My invention relates to sound recording and reproducing apparatus, and, more particularly, to sound recording and reproducing apparatus employing sound records of the film type.

In reproducing sound from records of this type, light from a suitable source is caused to pass through the sound track on the film and onto a photoelectric cell which transforms the light fluctuations into electrical pulsations, these pulsations being amplified and subsequently reproduced, as by means of a loud speaker. The film is advanced through the reproducing machine at a constant rate and is so located that, in its travel, the sound track passes in the line of a narrow slit through which the light passes prior to reaching the sound track. It is, accordingly, necessary to insure that the sound track will always be in alignment with the slit, since failure to do so will result in improper reproduction. To this end, there have been proposed various film guiding devices.

The most common method of guiding films through sound reproducing machines has been to place the film over a flanged roller, usually located in close proximity to the light slit, with that edge of the film bearing the sound track in contact with the flange on the roller, the flange being so located with respect to the slit that when one of the edges of the film bears against the flange, the sound track will be properly aligned with the light slit. By reason of the fact that the film is subject to shrinkage and the width of the film handled varies, it is necessary, if close guiding is required, to bias the film toward the guiding flange. This has been accomplished, for example, by providing a movable flange on the end of the roller opposite to that of the fixed guide flange, and urging the movable flange against the free edge of the film, as by means of a spring acting on the movable flange, so that the sound edge of the film will be in constant engagement with the guide flange of the roller.

An arrangement of this sort has various disadvantages. For example, should the edge of the film tear longitudinally, as at the sprocket holes, the sprung or biasing flange will have no effect on the film unless it can move in toward the guiding flange a sufficient distance to accommodate itself to the reduced width of the film in the torn portion thereof. Also, by virtue of the lateral force exerted on the film at its edge by the biasing flange, there is a constant tendency for the film to buckle, and hence the action of the flange is not uniform and smooth. Another disadvantage resides in the comparative difficulty of threading due to the fact that the biasing flange is encountered in the threading operation. This and other similar disadvantages are eliminated in my improved guiding device, it being the primary object of my invention to provide a film guiding mechanism which will be free from the objections noted.

Another object of my invention is to provide a film guiding mechanism which will be positive in its action and which will readily accommodate itself to any film regardless of its width.

A further object of my invention is to provide a film guiding mechanism which will constantly urge the film toward a suitable guide, will eliminate buckling, and will be smooth and uniform in its action.

Still another object of my invention is to provide a film guiding mechanism in which the biasing tendency may be regulated at will.

It is another object of my invention to provide a film guiding mechanism wherein the pressure exerted upon the film may be regulated at will.

Still another object of my invention is to provide a film guiding mechanism which will permit quick and easy threading of the film.

A further object of my invention is to provide a film guiding mechanism which is of compact, but durable construction, efficient in use, and particularly well suited to the requirements of economical manufacture.

The novel features that I consider characteristic of my invention are set forth with particularity in the appended claims, the invention itself, however, both as to its organization and its method of operation, together with additional objects and advantages thereof being best understood from the following description of a specific embodiment when taken in connection with the accompanying drawing in which Fig. 1 is a diagrammatic view of a reproducing system illustrating the application of my improved film guiding mechanism thereto, Fig. 2 is a perspective view of my invention as applied to a guide roller, Fig. 3 is a top plan view thereof, and Fig. 4 is a sectional view taken on the line IV—IV of Fig. 3 in the direction of the arrows.

Referring to the drawing, the system shown in Fig. 1 comprises a take-off reel 10 from which a film 11 is fed, by means of a plurality of sprockets 12, 14, 15 and 16, through a picture gate 17, around a guide pulley 18, and through a sound gate 19, the film being then wound up on a take-up reel 20. The film 11 is fed through the picture gate 17 in a step-by-step manner by means (not shown) well known to those skilled in the art, while its movement through the sound gate 19 is continuous and uniform. Light from a source 21 passes through an optical system, illustrated at 22, which condenses the light, in the form of a relatively narrow beam, onto a sound track 23 of the film 11, the light being sharply defined on the sound track 23 by means of a slit 24, and thence passing on to a light sensitive element, such as a photoelectric cell 25, the output of which is connected to any suitable amplifier.

The guide pulley or roller 18, around which the film 11 has a substantial wrap, is mounted for rotation on a shaft 30 fixed to a suitable base member or support 31, such as the frame of the machine or a partition therein, it being noted that the shaft 30 is perpendicular to the support 31. In order to maintain the sound track 23 of the film 11 in constant and proper alignment with the slit 24, I provide the roller 18, at one end thereof, with a fixed guide flange 32 against which the sound edge 33 of the film 11 is adapted to bear as it is fed through the machine. The roller 18 may, if desired, also be provided with a second flange on the other end thereof, but I prefer to omit the latter flange as this will facilitate threading of the film.

Fixed to the support 31 is an angular bracket 34 for supporting a biasing roller 35 which maintains the film in contact with the roller 18 and insures constant contact of the sound edge 33 with the flange 32 in a manner hereinafter to be described. The roller 35, which may take the place of the usual pressure roller, may, if desired, be made of a hard material, or it may be covered with a soft, resilient material, such as rubber. A block 36, provided with a lug portion 37, is mounted on the bracket 34 for rotation, on a set-screw 38, about an axis parallel to the plane of the support 31 and lying in a plane at right angles to the axis 30 of the roller 18, the block 36 being fixed in any desired position relative to the roller 18 by means of the setscrew 38. The free end of the block 36 is provided with a bore for receiving a shaft or pin 39, the ends of which extend out beyond the block 36. Journalled on the ends of the pin 39 is a yoke 40, the upper end of which is provided with bearings 41 for the reception of a shaft 42 which carries the biasing roller 35. It will thus be seen that the yoke 40 may be swung on the pin 39 for movement toward and away from the roller 18, so that the roller 35 may be brought into contact with the roller 18 or removed from contact therewith, as may be desired. The pin 39 acts, of course, as a fixed axis about which the roller 35 is swung, and the shaft or axis 42 of the roller 35 always remains parallel to the pin 39, no matter what its position may be. At the same time, the roller 35 is adjustable about the set screw 38 in a manner to permit location thereof with its axis or shaft 42 disposed at an angle to the axis or shaft 30 of the guide roller 18 but with neither of said axes lying in a common plane, whereby the roller 35 is adapted, upon engaging the film 11, to impart a force thereto urging the film longitudinally of the roller and, as illustrated in Fig. 2, toward the flange 32.

In order to insure the roller 35 being in contact with the guide roller 18 during the operation of the machine, I insert a coil spring 45 between the yoke 40 and an adjusting screw 46, threaded in the lug 37 of the block 36. One end of the spring 45 is fitted within a recess 47 in the yoke 40, while the other end thereof is received within the hollow end portion 48 of the adjusting screw 46. To adjust the tension of the spring 45, and hence the pressure of the roller 35 of the film 11 and roller 18, it is merely necessary to turn the adjusting screw 46 in the threads of the lug 37. A spring latch 50 is provided on the yoke 40 for engagement with a finger 51 on the lug 37 for retain the rollers 18 and 35 out of contact with each other against the action of the spring 45. Hence, when it is desired to thread the film, the roller 35 may be removed from contact with the roller 18 by pushing backward on the yoke 40, swinging the latter about the pin 39 until the latch 50 catches and engages with the finger 51. When the threading operation has been completed, the spring latch 50 is released from the finger 51 and the roller 35 will be automatically forced into contact with the film 11 and the roller 18 under the action of the coil spring 45.

The block 36 is initially adjusted about the screw 38 so that it will be angularly related to the roller 18. Consequently, the yoke 40 and, hence, the shaft 42 of the roller 35 will also be angularly related to the roller 18. In other words, when the block 36 is adjusted to and locked in the position shown in Fig. 2, instead of being perpendicular to the support 31 as is the shaft 30 of the roller 18, the shaft 42 of the roller 35 is at an angle to the support 31 and, therefore, also at an angle to the shaft 30 of the roller 18. The angle between the shafts 30 and 42 may be of any desired degree to suit particular requirements, although, for example, an angle of between 2° and 5° would ordinarily be sufficient. As the rollers 18 and 35 and the film 11 travel in the direction of the arrows A, B, and C, respectively, the component of the force applied by the roller 35 on the film 11 acting toward the flange 32 will force the film toward that flange, and thus the edge 33 of the film will be in constant contact therewith. When it is desired to change the biasing tendency of the roller 35, it is merely necessary to loosen the adjusting screw 38 and turn the block 36 and the roller 35 to any desired angle with respect to the roller 38. This will, of course, correspondingly change the biasing component of the force applied by the roller 35 on the film 11.

It will also be obvious that, inasmuch as the roller 35 acts upon the surface of the film 11, variations in the width of the film will not affect its operation. Furthermore, because the roller 35 acts on the surface of the film, it will avoid buckling of the film such as would be caused by a force applied to the edge thereof, and will also avoid the objectionable scraping of the edge of the film which often occurs where the film leaves a roller provided with flanges, one of which is pressed against the film by means of a spring. It will thus be seen that I have provided a film guiding mechanism that is smooth and uniform in its action, variable at will to change its biasing action, which eliminates and prevents buckling, and, at the same time, permits easy threading of the film.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. In combination, a film guide roller, a film biasing roller adapted to engage said guide roller, said rollers having their axes angularly disposed with respect to each other but neither of said axes lying in a common plane, whereby said biasing roller is adapted to apply to a film passing between it and said guide roller a force urging said film longitudinally of said guide roller, and means constantly urging one of said rollers toward the other.

2. In combination, a film guide roller, a film biasing roller adapted to engage said guide roller, said rollers having their axes angularly disposed with respect to each other but neither of said axes lying in a common plane, whereby said biasing roller is adapted to apply to a film passing between it and said guide roller a force urging said film longitudinally of said guide roller, and means constantly urging said biasing roller into engagement with said guide roller, said means being adjustable to vary the pressure between said rollers when they are in engaging relation.

3. In combination, a guide roller, a flange on said guide roller, a second roller mounted for yielding engagement with said guide roller whereby a film is receivable between said rollers, said second roller having its axis at an angle to the axis of said guide roller and being so disposed that the film is biased toward said flange, and means for varying the angle between the axes of said rollers.

4. In combination, a guide roller, a flange on said guide roller, a second roller mounted for yielding engagement with said guide roller whereby a film is receivable between said rollers and is adapted to be pressed against said guide roller, said second roller having its axis at an angle to the axis of said guide roller and being so disposed that the film is biased toward said flange, means for varying the angle between the axes of said rollers, and means for adjusting the pressure between said rollers.

5. In combination, a guide roller, a flange on said guide roller, a support, a yoke hinged to said support for movement toward and away from said guide roller, a biasing roller mounted on said yoke and contacting with said guide roller for imparting a biasing force toward said flange, means for varying the angle between said rollers, and means for varying the pressure between said rollers.

6. In combination, a base member, a film guide roller mounted on said base member, a support on said base member, a film biasing roller mounted on said support for pivotal movement about an axis in a plane at right angles to the axis of said guide roller, whereby the angle between the axes of said rollers may be changed at will, means for releasably retaining said film biasing roller in set position, and spring means urging said film biasing roller toward said film guide roller in a manner such that the axis of said film biasing roller always remains parallel to a fixed axis.

7. The invention set forth in claim 6 characterized in that said support includes a yoke member pivotally mounted for movement toward and away from said film guide roller, said film biasing roller being mounted on said yoke for rotation about an axis parallel to the pivotal axis of said yoke, and characterized in that said fixed axis is constituted by said pivotal axis.

8. In combination, a base member, a film guide roller mounted on said base member, a support on said base member, a yoke mounted on said support for movement about one axis toward and away from said guide roller and about a second axis at right angles to said first named axis, a spring constantly urging said yoke toward said guide roller, a film biasing roller rotatably mounted on said yoke, said biasing roller being maintained in engagement with said guide roller under the influence of said spring and said yoke being movable about said second named axis whereby to change the angle between the axes of said guide roller and said biasing roller, and means for releasably retaining said yoke in set position.

EDWARD WASHBURN KELLOGG.